United States Patent
Satran et al.

[11] Patent Number: 6,062,775
[45] Date of Patent: May 16, 2000

[54] CUTTING TOOL AND INSERT BEARING CARTRIDGE THEREFOR

[75] Inventors: Amir Satran; Yaron Eizen, both of Kfar Vradim, Israel

[73] Assignee: Iscar Ltd., Israel

[21] Appl. No.: 09/069,182

[22] Filed: Apr. 29, 1998

[30] Foreign Application Priority Data

May 2, 1997 [IL] Israel ......................................... 120762

[51] Int. Cl.⁷ ........................................................ B23C 5/20
[52] U.S. Cl. ................................. 407/46; 407/51; 407/53; 407/58
[58] Field of Search .................................. 407/46, 51, 53, 407/58, 33, 34, 44, 47, 48, 49, 35, 40, 41, 42, 43, 36, 37, 38; 83/846, 847, 848, 851

[56] References Cited

U.S. PATENT DOCUMENTS

| | | | |
|---|---|---|---|
| 4,330,227 | 5/1982 | Raye et al. | 407/36 |
| 4,551,043 | 11/1985 | Kirchberger | 407/43 |
| 4,934,880 | 6/1990 | Stashko | 407/42 X |
| 5,002,104 | 3/1991 | Stewart | 144/230 |
| 5,183,089 | 2/1993 | Nolander et al. | 407/46 X |
| 5,333,659 | 8/1994 | Carpenter et al. | 144/231 |
| 5,423,361 | 6/1995 | Richards | 407/42 X |
| 5,658,101 | 8/1997 | Hammer | 407/33 X |
| 5,676,505 | 10/1997 | Gauss et al. | 407/58 X |
| 5,788,426 | 8/1998 | Daniels | 407/46 X |

FOREIGN PATENT DOCUMENTS

| | | |
|---|---|---|
| 0 024 597 A1 | 8/1980 | European Pat. Off. . |
| 3924884 A1 | 7/1989 | Germany . |
| 2018652 | 10/1979 | United Kingdom ..................... 407/46 |
| 2 117 295 | 3/1983 | United Kingdom . |

OTHER PUBLICATIONS

International Search Report—PCT/IL 98/00192—Jun. 30, 1998.

PCT Written Opinion, International Application No. PCT/IL98/00192 dated Jul. 1, 1999.

*Primary Examiner*—Henry W.H. Tsai
*Attorney, Agent, or Firm*—Pennie & Edmonds LLP

[57] ABSTRACT

A cutting tool including a cutting tool body having a peripheral surface formed with a plurality of recesses each adapted to receive an insert receiving cartridge. Each cartridge has transversely directed first and second side surfaces with an imaginary bisector plane therebetween defining a leading cartridge portion associated with the side surface and a trailing cartridge portion associated with the side surface. The leading cartridge portion includes a chip clearance wall and the trailing cartridge portion includes an insert receiving pocket with a cutting insert having a peripheral cutting edge which protrudes in respect of the peripheral surface. Each recess has leading and trailing surfaces converging away from the peripheral surface and against which abut the side surfaces of its associated cartridge received therein. Both the side surfaces are co-extensive with the leading and trailing surfaces. Adjacent cartridges are so closely packed that a trailing surface of a first cartridge lies substantially co-directional and contiguous with the chip clearance wall of a second cartridge so as to define an interrupted, substantially continuous chip clearance wall for a cutting insert borne by the second cartridge.

15 Claims, 4 Drawing Sheets

CUTTING TOOL AND INSERT BEARING CARTRIDGE THEREFOR

FIELD OF THE INVENTION

The invention generally relates to cutting tools and insert bearing cartridges therefor.

BACKGROUND OF THE INVENTION

For use in Applicant's SDN-D315-12-10-4091 milling cutter shown in FIG. 1, an insert bearing cartridge has a pair of transversely directed side surfaces with an imaginary bisector plane defining a leading cartridge portion with a chip clearance wall and a trailing cartridge portion with an insert receiving pocket. The insert receiving pocket has a pocket base wall which is substantially parallel to its associated side surface.

Due to this conventional design, a cartridge is mounted in a relatively deep and elongated recess formed in a peripheral surface of a milling cutter body such that both its leading and trailing cartridge portions substantially lie wholly radially inward of the peripheral surface whereby it is adequately supported by a support beam and has sufficient chip clearance space. As shown, a recess has a straight trailing surface having a similar dimension as the side surface associated with the trailing cartridge portion which abuts thereagainst. In addition, a recess has a bow shaped leading surface which is considerably longer than the side surface associated with the leading cartridge portion, the leading surface having an inner portion adjacent its associated trailing surface against which the side surface abuts and an outer portion delimiting the necessary chip clearance space.

A disadvantage of the milling cutter of the above type is that the pitch between adjacent cartridges is limited such that a 250 mm diameter milling cutter has 14 effective cutting edges denoted Z=14. Further disadvantages of the milling cutter of the above type are that its relatively costly milling cutter body is poorly protected by cartridges and is insufficiently strong to absorb the cutting forces due to its support beams having a relatively small cross-section at their bases.

SUMMARY OF THE INVENTION

In accordance with a first aspect of the present invention, there is provided a cutting tool comprising a cutting tool body having a peripheral surface formed with a plurality of recesses each adapted to receive an insert bearing cartridge therein, each cartridge having transversely directed first and second side surfaces with an imaginary bisector plane therebetween defining a leading cartridge portion associated with said first side surface and a trailing cartridge portion associated with said second side surface, said leading cartridge portion including a chip clearance wall and said trailing cartridge portion including an insert receiving pocket with a cutting insert having a peripheral cutting edge, each recess having leading and trailing surfaces converging away from said peripheral surface and against which abut said side surfaces of its associated cartridge received therein, said peripheral cutting edge protruding in respect of said peripheral surface, characterized in that said first side surface is substantially co-extensive with said leading surface whereby said chip clearance wall lies approximately flush with said peripheral surface.

By virtue of this design, the insert bearing cartridges can preferably be closely packed so as to considerably reduce a cutting tool's insert to insert pitch in comparison to that of a conventional cutter tool with insert bearing cartridges, thereby affording more effective cutting edges for the same diameter cutter. In addition, such close packing of cartridges effectively forms a substantially continuous shield to a cutting tool body, thereby providing far greater protection thereto.

Such close packing is facilitated by the use of substantially co-directional and contiguous surfaces of an adjacent cartridge pair so as to define an interrupted, substantially continuous chip clearance wall for a cutting insert borne by one of the cartridge pair. The substantially co-directional and contiguous surfaces include the chip clearance wall of a first insert bearing cartridge and a complimentary chip clearance wall of a second insert bearing cartridge, thereby providing sufficient gullet space for chips during the cutting process despite the smaller pitch between adjacent cartridges.

The above design can be readily implemented in a wide range of cutting tools employing a plurality of insert bearing cartridges including rotary milling cutters including face and peripheral milling cutters and milling slotters, boring bars, broaching cutters and others. In addition, a cutting tool in accordance with the present invention can include an annular cutting tool body having interiorly mounted insert bearing cartridges.

In accordance with a second aspect of the present invention, there is provided an insert bearing cartridge comprising transversely directed first and second side surfaces with an imaginary bisector plane therebetween defining a leading cartridge portion associated with said first side surface and a trailing cartridge portion associated with said second side surface, said leading cartridge portion including a chip clearance wall and said trailing cartridge portion including an insert receiving pocket formed with a pocket base wall substantially transversely directed to said chip clearance wall, characterized in that said pocket base wall is acutely inclined relative to said second side surface.

The angle subtended between the pocket base wall and the second side surface is preferably about 32° and can lie in the range of 32°±15°.

In accordance with a third aspect of the present invention, there is provided a cutting tool body for use with a plurality of insert bearing cartridges each having substantially transversely directed side surfaces, the cutting tool body having a peripheral surface formed with a plurality of recesses each adapted to receive a cartridge therein, each recess having leading and trailing surfaces converging away from said peripheral surface and against which abut said side surfaces of its associated cartridge received therein, characterized in that said first side surface is substantially co-extensive with said leading surface.

In the case of a cutting tool body for milling applications, since the second side surface is preferably of the same length as the first side surface, the cutting tool body takes on the appearance of a cogwheel whose teeth are constituted by the support beams of the cartridges. This design affords a larger cross-section at the bases of the support beams compared to that of a conventional cutting tool body of the same diameter and can therefore withstand larger cutting forces.

BRIEF DESCRIPTION OF THE DRAWINGS

For a better understanding of the present invention and to show how the same can be carried out in practice, reference will now be made to the accompanying drawings, in which.

DETAILED DESCRIPTION OF PREFERRED EMBODIMENTS

Figure 1:
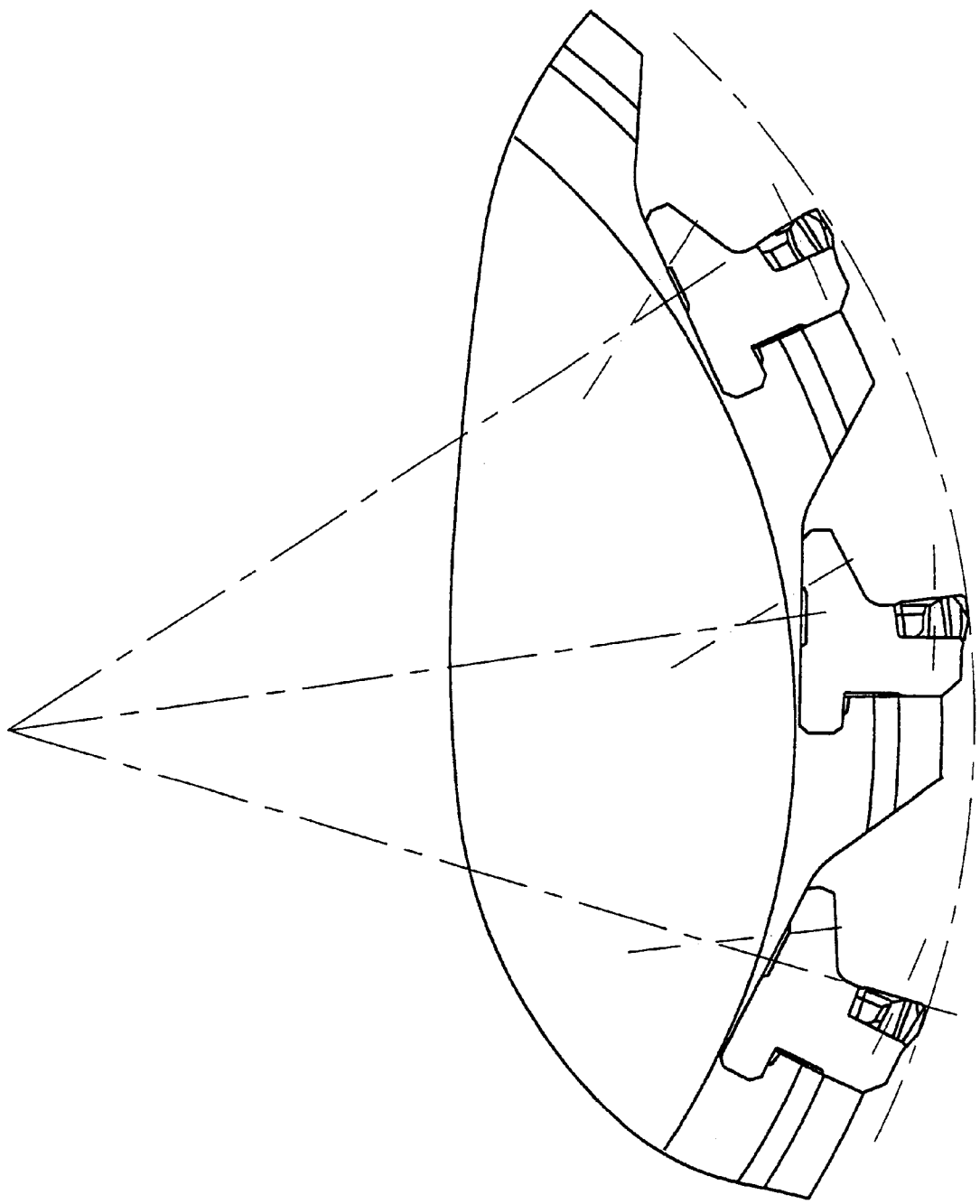
FIG. 1 is a side view of a conventional milling cutter.
Figure 2:
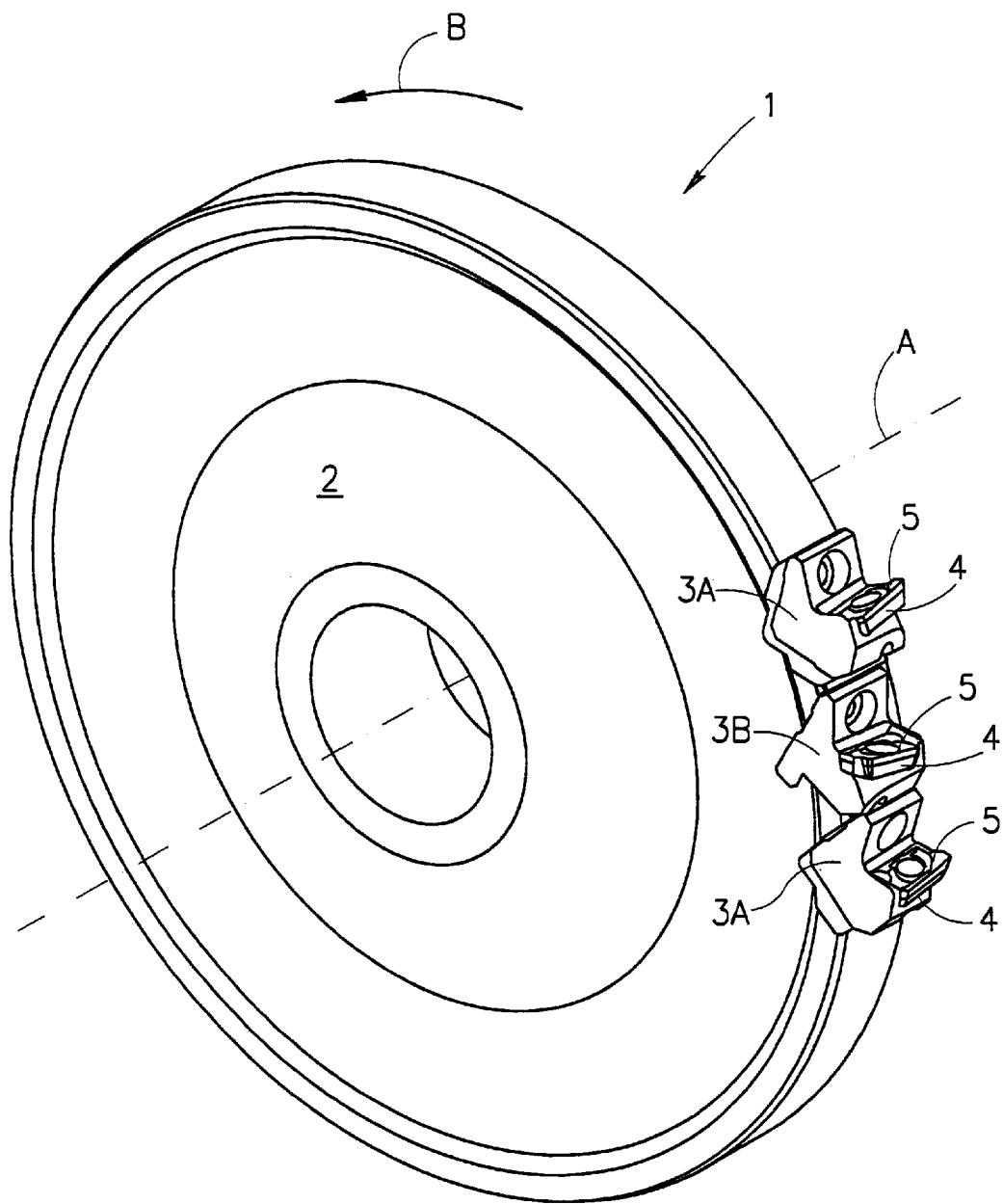
FIG. 2 is a perspective view of a milling slotter in accordance with the present invention.

With reference to the drawings, FIG. 2 shows a milling slotter 1 rotatable about a longitudinal axis A in a direction B. The milling slotter 1 includes a milling slotter body 2 fitted with alternate left and right handed insert bearing cartridges 3A and 3B. The cartridges 3 are adapted to releasably receive a cutting insert 4 as, for example, described and illustrated in Applicant's U.S. Pat. No. 5,207,538. The cutting inserts 4 each have a peripheral cutting edge 5.

Figure 3:
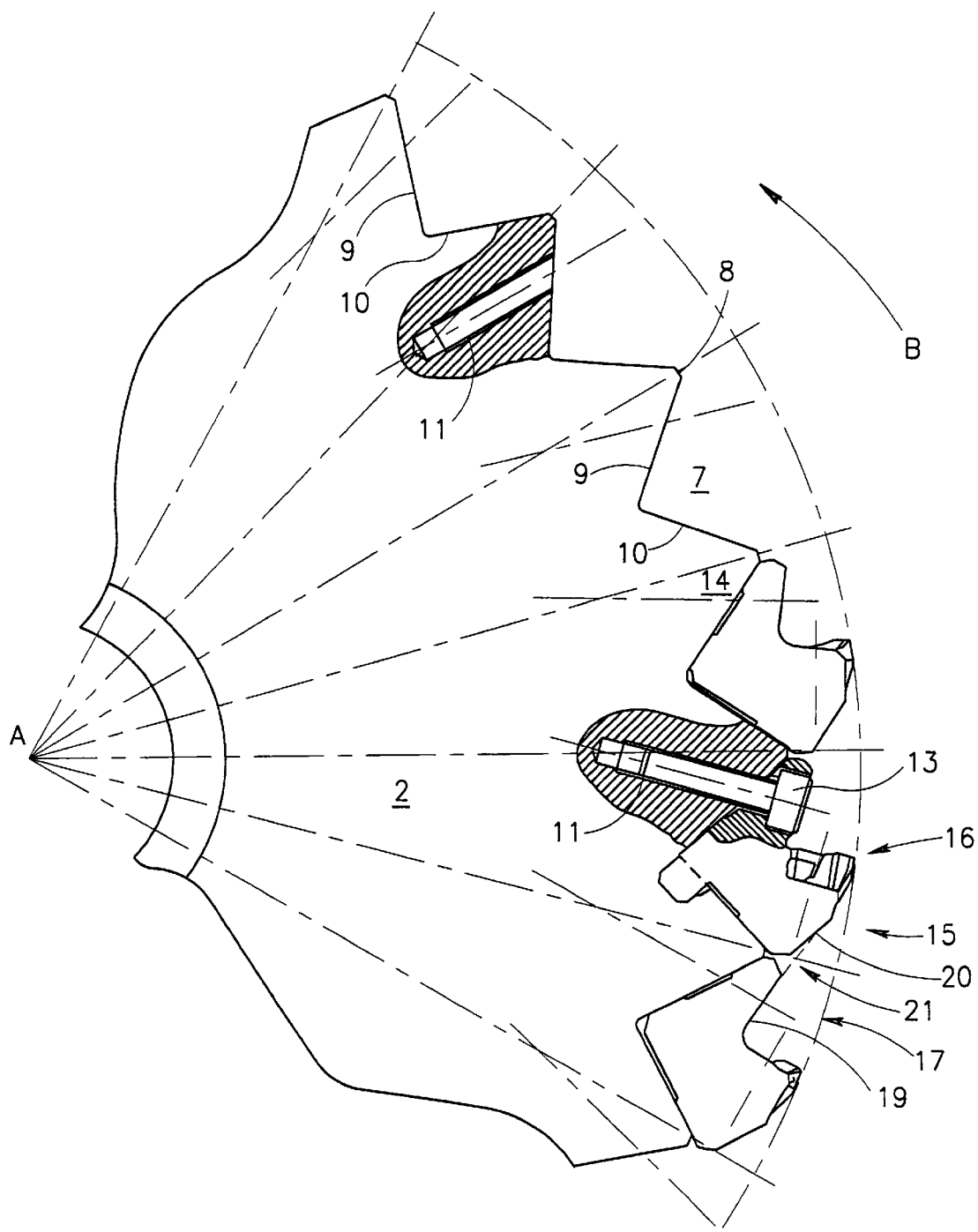
FIG. 3 is a close up end view of a portion of the milling slotter of FIG. 2.

As shown in FIG. 3, the cartridges 3 are snugly mounted in recesses 7 formed in a peripheral surface 8 of the milling cutter body 2. The recesses 7 each have inclined leading and trailing support surfaces 9 and 10 converging away from the peripheral surface 8. The leading support surfaces 9 are each provided with a tapped bore 11 for receiving a clamping screw 13 for screw clamping a cartridge 3.

As seen in FIG. 3, the lengths of the leading support surface 9 and the trailing support surface 10 are substantially the same, giving each recess 7 a substantially isosceles shape. Adjacent recesses 7 are peripherally closely packed so that peripheral body portions 14 defined therebetween have a sprocket like appearance with their substantially isosceles shape such that the cartridge bearing portion of the milling cutter body 2 takes on the appearance of a cogwheel. The cartridges 3 each have a trailing cartridge portion 15 with an insert receiving pocket 16 for releasably receiving a cutting insert 4 and a leading cartridge portion 17 including a chip clearance wall 19 which slightly protrudes beyond the peripheral surface 8.

As shown, the cartridges 3 are so peripherally closely packed that a trailing surface 20 of a forward cartridge lies substantially co-directional and contiguous with the chip clearance wall 19 of an adjacent rearward cartridge. As seen FIG. 3, an imaginary extension of the chip clearance wall intersects the trailing surface 20 of the forward cartridge. The trailing surface 20 thereby acts as a complimentary chip clearance wall so as to define together with the chip clearance wall 19 an interrupted, effectively continuous chip clearance wall 21 affording sufficient gullet space for chips cut by the cutting insert 4 borne by the rearward cartridge.

A 250 mm diameter milling cutter in accordance with the present invention has Z=18 effective cutting edges as opposed to the Z=14 effective cutting edges of the Applicant's SDN-D315-12-10-4091 milling cutter.

Figure 4:
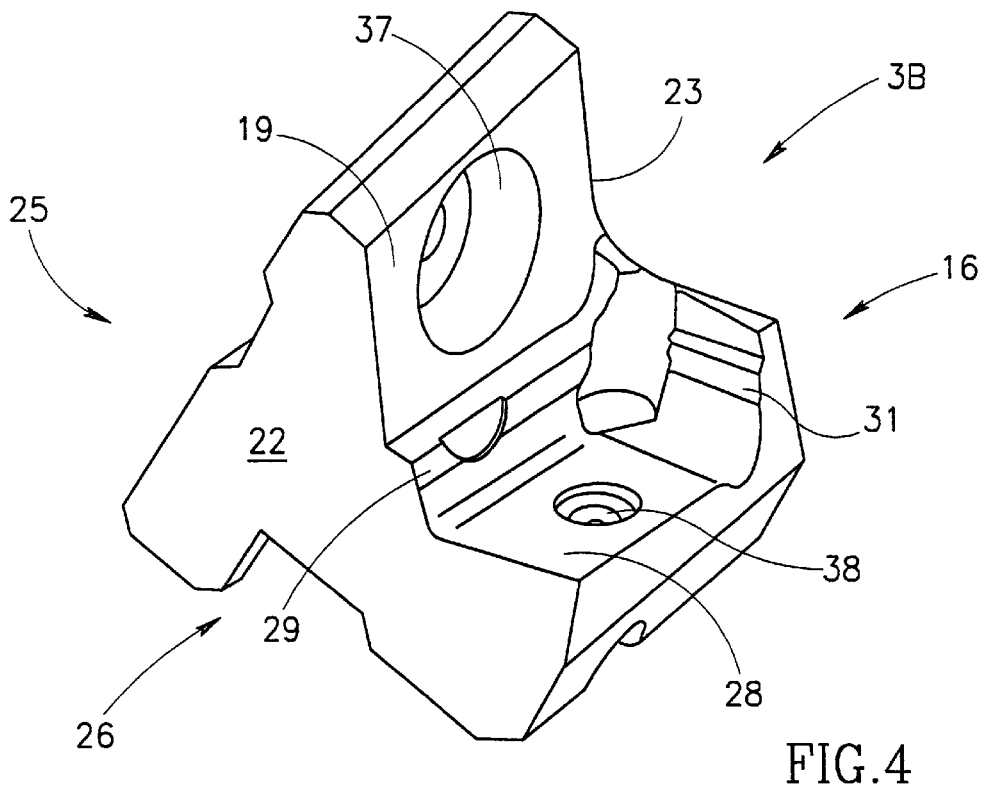
FIG. 4 is a perspective view of a right handed insert bearing cartridge of the milling slotter of FIG. 2.
Figure 5:
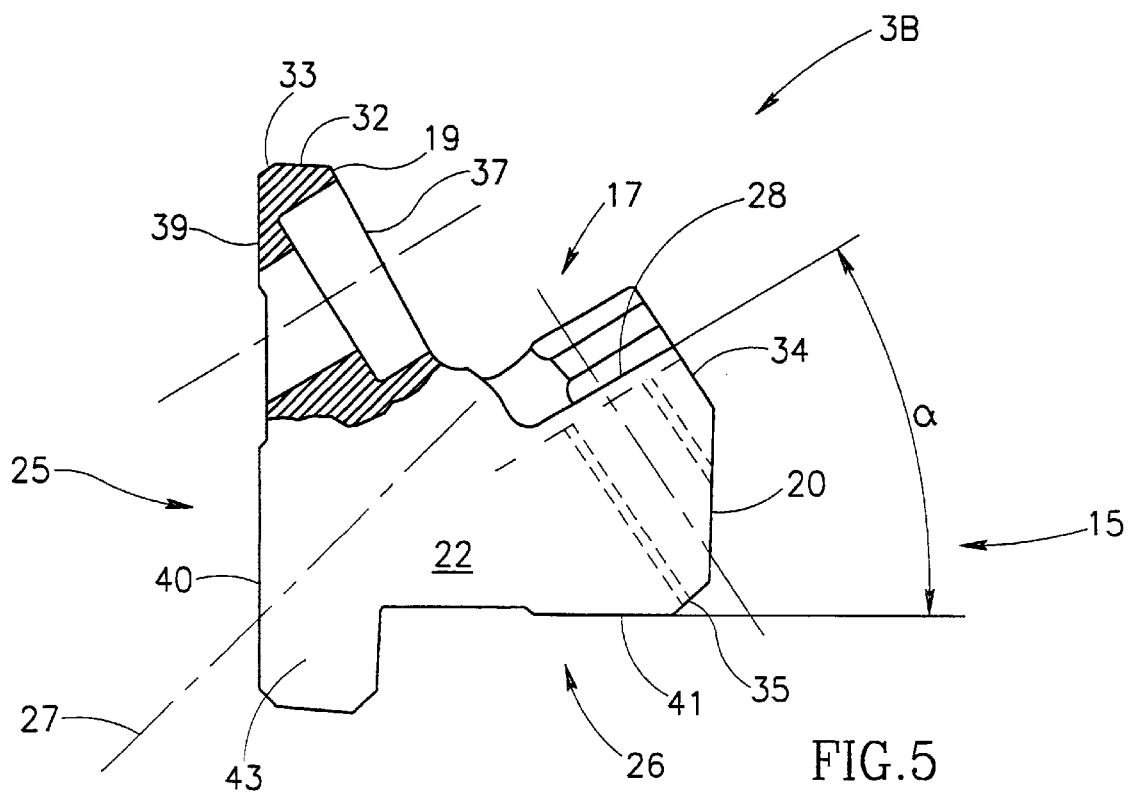
FIG. 5 is a left side view of the cartridge of FIG. 4.

FIGS. 4 and 5 show a right handed cartridge 3B having left and right side flank walls 22 and 23 and perpendicular first and second side surfaces 25 and 26, the side surfaces 25 and 26 being substantially co-extensive with the leading and trailing surfaces 9 and 10 when mounted in a recess 7.

As seen in FIG. 5, an imaginary bisector plane 27 between the side surfaces 25 and 26 define the trailing and leading cartridge portions 15 and 17 formed respectively with the insert receiving pocket 16 and the chip clearance wall 19.

As shown in FIG. 4, the insert receiving pocket 16 is formed with a base wall 28, a long support wall 29 and a short support wall 31 for supporting the above-mentioned cutting insert.

As shown in FIG. 5, the base wall 28 is perpendicular to the chip clearance wall 19 and subtends an angle $\alpha=32°$ relative to the side surface 26.

The chip clearance wall 19 is connected to the side surface 25 via receding surface 32 and a chamfered surface 33 whilst the base wall 28 is connected to the side surface 26 via surfaces 34, 20 and 35.

The leading cartridge portion 17 which tapers towards an end surface comprising surfaces 32, 33 is formed with a throughgoing bore 37 through which a clamping screw 13 extends (see FIG. 3) whilst the base wall 28 is formed with a tapped bore 38 for screw threadingly receiving a clamping screw for screw clamping a cutting insert in the insert receiving pocket 16.

The side surface 25 is provided with a pair of spaced apart co-planar abutment surfaces 39 and 40 laterally disposed with respect to the throughgobore 37 whilst the side surface 26 is provided with a planar abutment surface 41.

The left hand flank wall 22 has a co-directionally projecting tab 43.

While the invention has been described with respect to a limited number of embodiments, it will be appreciated that many variations, modifications and other applications of the invention can be made. For example, a cartridge can be fashioned such that its chip clearance wall 19 can lie slightly inward of a cutter body's peripheral surface. In addition, a cartridge can be fashioned with modifications to its first and second side surfaces. Also, the angle $\alpha$ can lie in the range of about $32°\pm15°$. And, its surfaces 20 and 34 can be fashioned as a curved or multi-faceted surface in which cases they would also participate to complete the continuous clearance wall 21.

What is claimed is:

1. A cutting tool comprising:

a cutting tool body having an axis of rotation and a peripheral surface formed with a plurality of recesses; each recess having leading and trailing surfaces converging away from said peripheral surface in a direction of said axis of rotation, the trailing surface of a first recess and the leading surface of an adjacent recess diverging away from a peripheral surface portion, with a circumferential spacing between adjacent recesses being substantially less than a length of either the leading surface or the trailing surface; and an insert bearing cartridge mounted in each recess, each cartridge having a leading cartridge portion provided with a chip clearance wall and a trailing cartridge portion provided with an insert receiving pocket having a pocket base wall and a trailing surface, wherein the trailing surface of a first cartridge is contiguous with the chip clearance wall of an adjacent second cartridge so as to jointly define a gullet space for chips formed during a cutting process, with an imaginary extension of said chip clearance wall intersecting said trailing surface.

2. The cutting tool according to claim 1, wherein at least a portion of said chip clearance wall slightly protrudes from said peripheral surface.

3. The cutting tool according to claim 1, wherein said leading cartridge portion is provided with a throughbore passing through said chip clearance wall and a base wall of said insert receiving pocket is provided with a tapped bore configured to receive an insert clamping screw.

4. The cutting tool according to claim 1, wherein said chip clearance wall and said pocket base wall are substantially perpendicular to each other.

5. The cutting tool according to claim 1, wherein the leading and trailing surfaces of each recess are substantially the same, thereby providing each recess with an isosceles shape.

6. The cutting tool according to claim 5, wherein a first recess is spaced apart from an adjacent recess by a peripheral body portion also having a substantially isosceles shape.

7. A cutting tool comprising:

a cutting tool body with a plurality of peripherally disposed insert bearing cartridges correspondingly screw clampingly received in recesses formed in a peripheral surface of said cutting tool body, each insert bearing cartridge having transversely directed first and second side surfaces for correspondingly bearing against leading and trailing surfaces of a recess;

each insert bearing cartridge also having a leading cartridge portion associated with said first side surface and a trailing cartridge portion associated with said second side surface;

said leading cartridge portion including a chip clearance wall and said trailing cartridge portion including an insert bearing pocket with a cutting insert having a peripheral cutting edge protruding in respect of said peripheral surface;

first and second of said plurality of peripherally disposed insert bearing cartridges being so packed together that a trailing surface of said first cartridge lies contiguous with said chip clearance wall of said second cartridge so as to jointly define a gullet space for a cutting insert borne by said second cartridge; wherein each insert bearing cartridge has substantially perpendicularly disposed first and second side surfaces meeting at an apex for being received in a V-shaped recess, and each insert bearing cartridge being screw clamped by a clamping screw passing through a throughbore formed in its leading cartridge portion.

8. The cutting tool according to claim 7, wherein said first side surface is fully co-extensive with said leading surface.

9. The cutting tool according to claim 7, wherein said insert receiving pocket is formed with a pocket base wall which is substantially transversely directed to said chip clearance wall and acutely inclined relative to said second side surface.

10. The cutting tool according to claim 9, wherein an angle between said pocket base wall and said second side surface lies in the range of about 32°±15°.

11. The cutting tool according to claim 9, wherein said chip clearance wall and said pocket base wall are substantially perpendicular to each other.

12. The cutting tool according to claim 7, wherein said first and second side surfaces are substantially perpendicular to each other.

13. The cutting tool according to claim 7, wherein said throughbore is substantially centrally disposed in said chip clearance wall.

14. The cutting tool according to claim 13, wherein said chip clearance wall is substantially square shaped.

15. The cutting tool according to claim 7, wherein each recess's leading surface is formed with a substantially centrally disposed tapped bore for screw threadingly receiving a clamping screw for screw clamping said insert bearing cartridge.

* * * * *